(No Model.)
D. M. PARRY.
SHAFT COUPLING FOR VEHICLES.
No. 396,231. Patented Jan. 15, 1889.
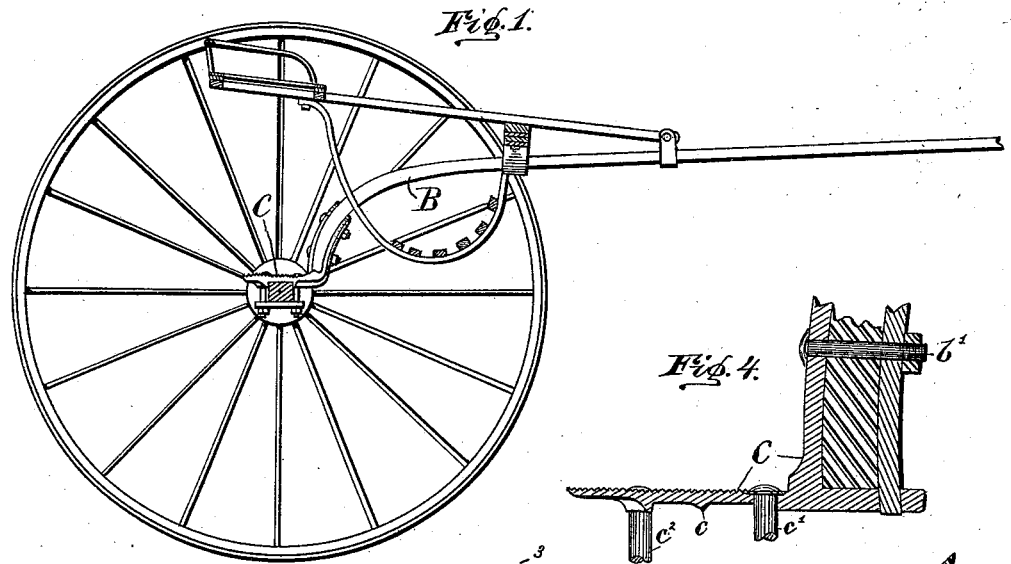
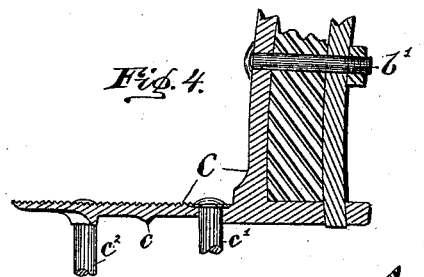
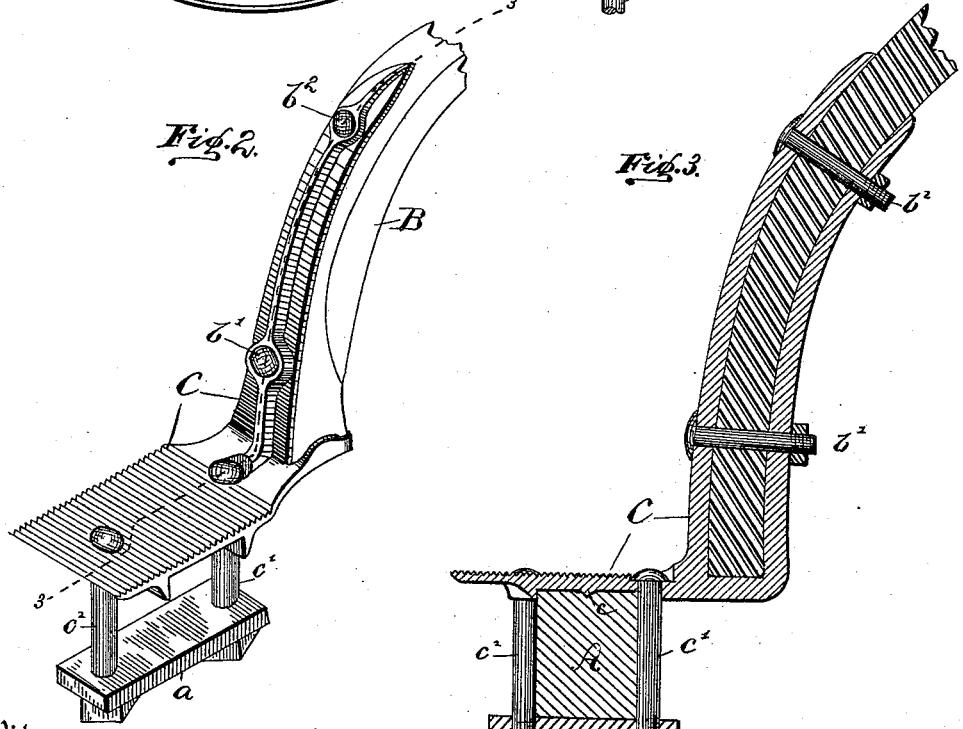
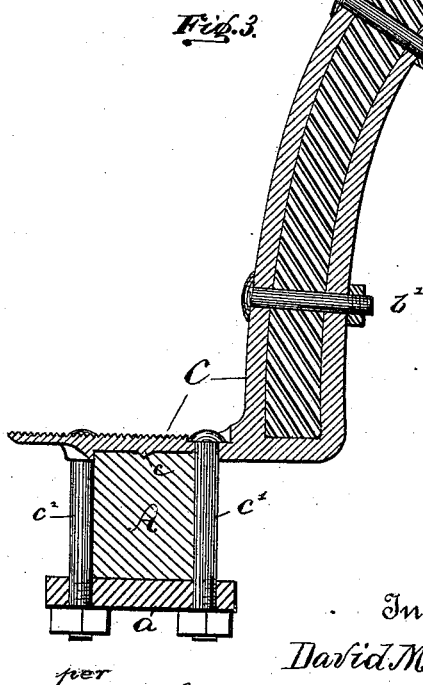
Witnesses:
C. W. H. Brown,
F. H. Wood.
Inventor:
David M. Parry,
per
E. W. Bradford,
Attorneys.

UNITED STATES PATENT OFFICE.

DAVID M. PARRY, OF INDIANAPOLIS, INDIANA.

SHAFT-COUPLING FOR VEHICLES.

SPECIFICATION forming part of Letters Patent No. 396,231, dated January 15, 1889.

Application filed April 10, 1888. Serial No. 270,207. (No model.)

*To all whom it may concern:*

Be it known that I, DAVID M. PARRY, a citizen of the United States, residing at Indianapolis, in the county of Marion and State of Indiana, have invented certain new and useful Improvements in Shaft-Couplings, of which the following is a specification.

My said invention relates to that class of vehicles known as "road-carts;" and it consists in a new form of attachment whereby the shafts are secured to the axle, and a step for use in entering the vehicle at the same time provided.

Referring to the accompanying drawings, which are made a part hereof, and on which similar letters of reference indicate similar parts, Figure 1 is a central vertical sectional view of a road-cart embodying my said invention; Fig. 2, a perspective view of the rear end of a shaft having my improved coupling attached; Fig. 3, a vertical sectional view of the same on the dotted line 3 3 in Fig. 2; and Fig. 4, a view similar to a portion of Fig. 3, showing substantially the same construction but in two pieces.

In said drawings, the portions marked A represent the axle of the vehicle; B, the shafts, and C my improved coupling. The vehicle as a whole, the axle, and the shafts are not of my present invention, and so far as they relate thereto will be readily understood without further description, except as they may be incidentally mentioned in describing the invention.

The coupling C, I prefer to construct in the main all in one piece; but, as will be presently described, it may be made in two or more pieces. It may be cast or forged; but I prefer to make it of malleable casting and in a single piece. Between its two upwardly-extending arms the shaft B is secured by two bolts, $b'$ and $b^2$. Its rearwardly-extending part, which forms the step, should be serrated or roughened on its upper surface, and said surface has also preferably countersunk holes to receive the bolt-heads. Its under side contains a transverse groove formed to fit closely onto the top side of the axle A, and it is also provided with a small projection, $c$, which enters a corresponding cavity in the axle, and by means of this formation it is held securely in its position after being fastened onto said axle. Two bolts, $c'$ and $c^2$, extend down through this rearwardly-extending portion closely alongside the axle A and through the clip $a$, as shown, and the device is thus firmly secured on said axle.

By my construction I not only provide in a single piece a coupling between the axle and the shaft, and also a step to be used in mounting the vehicle, but I also secure that the shaft shall be slightly in advance of the axle, and also that the step shall be directly upon the axle, and thus provide a step which, when used, will not act as a lever to tip up the shafts, but, on the contrary, will be equally balanced.

While I prefer, as already stated, to construct this coupling in a single piece, still I may, as shown in Fig. 4, form one of the two arms between which the end of the shaft is placed separately, and extend its end down through a hole formed for the purpose in what in this construction will be the main portion without departing from my invention.

Having thus fully described my said invention, what I claim as new, and desire to secure by Letters Patent, is—

1. The combination, in a vehicle, of the axle A, provided with a cavity, and the coupling C, provided with a projection, $c$, which is adapted to enter said cavity when the coupling is placed on the axle, whereby said coupling is held securely in position on said axle, substantially as shown and described.

2. The combination, in a vehicle, of the axle, the shaft, a coupling, formed as described, between the two forward arms whereof the shaft is secured and to the under side of the rearwardly-extending portion whereof the axle is secured, the top of said rearwardly-extending portion being roughened or serrated to form a step, substantially as set forth.

In witness whereof I have hereunto set my hand and seal, at Indianapolis, Indiana, this 5th day of April, A. D. 1888.

DAVID M. PARRY. [L. S.]

Witnesses:
C. BRADFORD,
F. W. WOOD.